Sept. 18, 1928.
C. E. DELLENBARGER
SHEET FORMING MACHINE
Filed Sept. 23, 1920
1,684,436
2 Sheets-Sheet 1
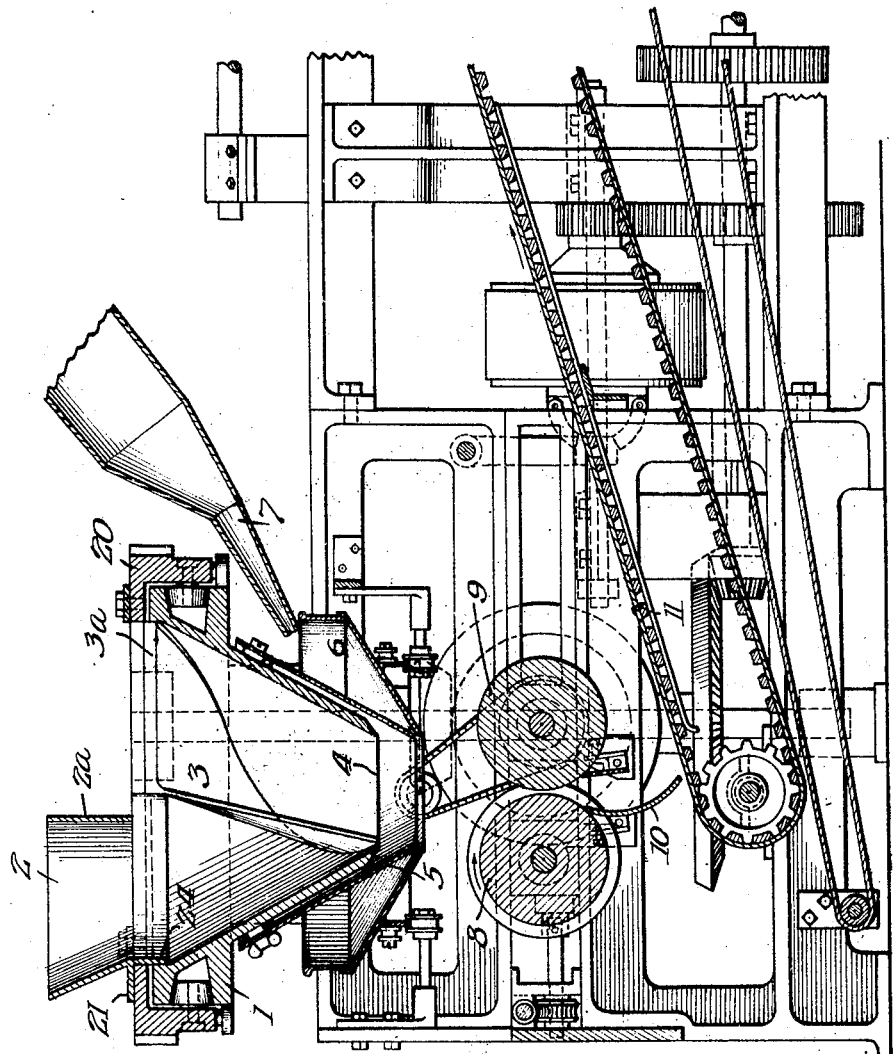

Sept. 18, 1928.
C. E. DELLENBARGER
1,684,436
SHEET FORMING MACHINE
Filed Sept. 23. 1920
2 Sheets-Sheet 2
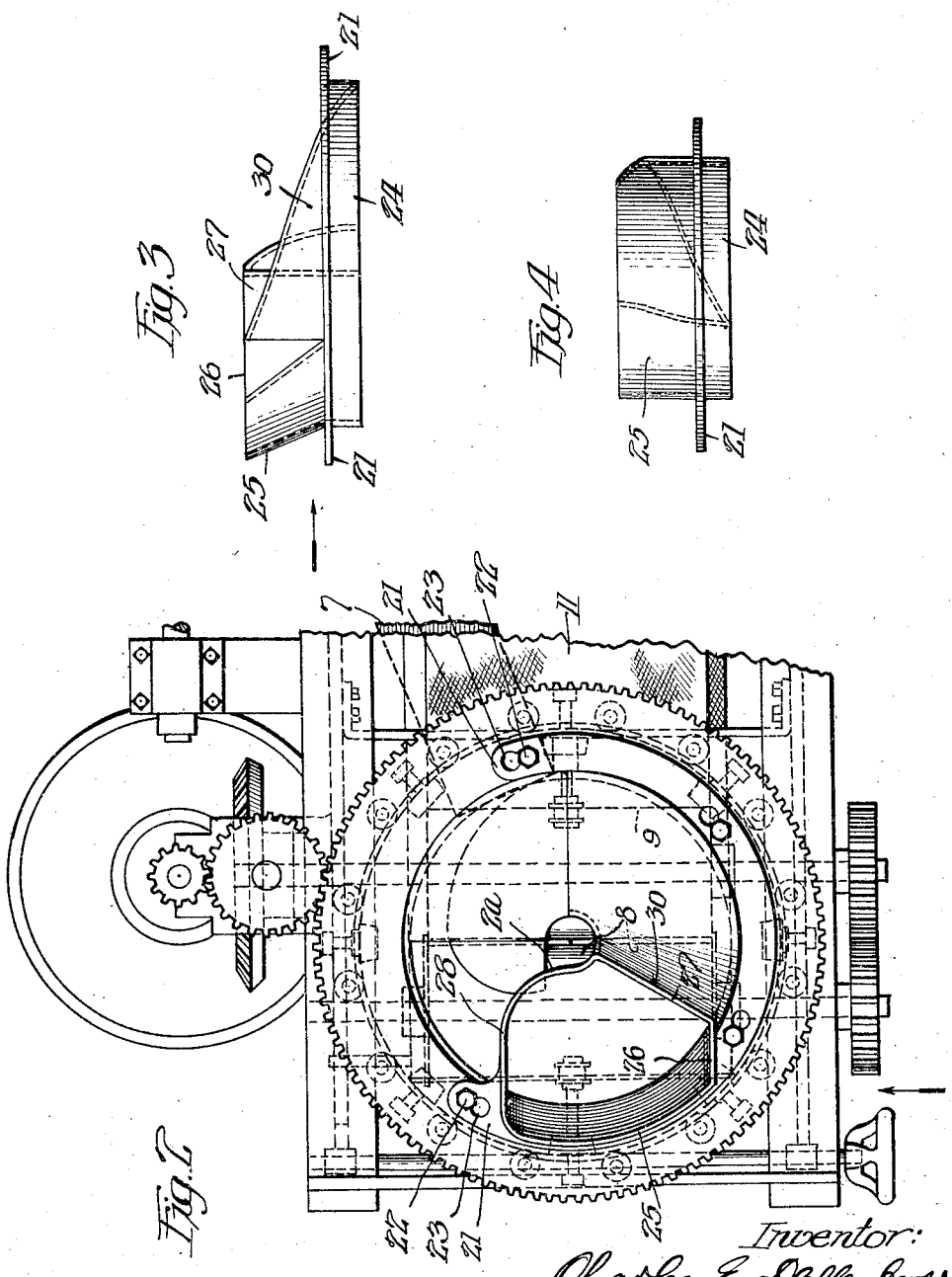

Patented Sept. 18, 1928.

1,684,436

UNITED STATES PATENT OFFICE.

CHARLES E. DELLENBARGER, OF PHILADELPHIA, PENNSYLVANIA, ASSIGNOR TO PAUL CARPENTER, OF GLENVIEW, ILLINOIS.

SHEET-FORMING MACHINE.

Application filed September 23, 1920. Serial No. 412,239.

The present invention relates to methods of and machines for forming and handling sheets generally and more particularly for the forming and handling of sheets from resinous, gummy or sticky material and plastic substances such as gum chicle, gum pontianak, gum caoutchouc, chocolate, taffy, cake and biscuit dough and other confectionery and bakery goods, asphaltum, compounds containing tar, pitch, or other bituminous substances, and the like, which under working conditions are sticky, or both sticky and elastic.

While the invention has a wide utility for forming and handling by mechanical means, a large variety of products, for purposes of illustration it is here shown as embodied in a machine for producing mechanically from a mass of softened material, substantially continuous sheets of that form of gum chicle, colloquially known as chewing gum. It will therefore be described in connection with the production of such articles.

The principal objects of my invention are to produce, presently, sheets and eventually sticks, of gum chicle, mechanically, and particularly to produce continuous sheets of substantially uniform width, thickness, consistency and weight without requiring manual or other personal contact with the material by any operative engaged in producing such sheets; to reduce the time required for such production and consequently cheapen the cost of production and enlarge the amount possible for a factory to produce; to produce sheets of a more even and homogeneous texture and more uniform dimensions, density and finish and hence an article more merchantable; to better, by the use of improved machinery, the conditions of hygiene under which such sheets are formed and finished and thereby to preserve, as far as possible, the purity of the material operated upon and prevent the entrance thereinto of any foreign matter and any danger of contamination or infection thereto ensuant from hand manipulation; to provide improved sheet forming mechanism, to provide improved means for preventing the sheet from adhering to the machine elements acting upon it, and to provide improved means for removing and recovering excess materials not consumed in the sheet forming process.

The present application is in the main a continuation in part of my co-pending application, Serial No. 266,679, in which and in co-pending applications 266,680 and 266,681, (all filed December 14, 1918) certain features of invention are more fully set forth and claimed.

Prior to the machine of the Barbieri Patent No. 968,109, in the manufacture of chewing gum, the plastic material was manipulated largely by hand, and the various processes and steps incident to manufacture necessitated that each relatively short sheet be subjected to the operation of a considerable number of people. In order to maintain the sheets in a sufficiently plastic condition, the manufacture of chewing gum has heretofore necessarily been conducted under conditions of relatively high temperature, rendering it impossible to obtain much that has been desirable in the way of hygienic conditions, owing to the fact that it was not found possible, commercially, to produce and cut continuous sheets of gum by machinery and without manual processing.

The relatively "hot process" practiced by the utilization of the machine of the Barbieri patent involves esentially two main features which it has been found desirable to avoid, the first that the forming rolls must be heated to keep the gum in plastic condition, thereby not only maintaining a temperature required for working conditions higher than would otherwise be necessary, but also rendering the sheet quite plastic and therefore somewhat difficult to handle, since it has been found in practice that the sheet thus produced became easily distorted or torn; and, the second, that the highly plastic and sticky condition of the sheet required the cutting of the sheet from the forming rolls by means of knives which tore or scraped the sheet of gum from the forming rolls, thus producing a relatively rough surface. A further object of my invention has, therefore, been to avoid the expense in, complications of, and other objections to such machines involved in the manufacture, maintenance and operation of the heated forming rolls and scrapers, and to provide a relatively "cold process" and eventually to produce a sheet which has a greater tensile strength and a smoother superficial texture.

In the attainment of the objects above set forth and to overcome the objections stated and also to gain certain other benefits and advantages which will be hereinafter more specifically pointed out, I have provided a machine, a preferred form of which is shown on the accompanying drawings wherein—

Figure 1 is an enlarged side elevational view, partly in vertical section, of the left-hand end of a machine embodying my present invention;

Figure 2 is an enlarged top plan view of a portion of the machine of Figure 1;

Figure 3 is an elevational view of the hopper employed in the machine of Figure 1, viewing the same from the side of the machine, that is, in the direction indicated by the arrow in Figure 2; and Figure 4 is another elevational view of the hopper, taken at a right angle to that of Figure 3, regarding the hopper from the aspect indicated by the arrow in Figure 3.

The machine in its preferred form, as completed for the manufacture of sticks of chewing gum, comprises a series of sets of mechanisms through which the material acted upon progresses continuously and is finally formed into small sections suitable for wrapping.

Briefly stated, these sets of mechanisms may be enumerated as follows: (1) the receptacle for receiving and kneading the hot or moist plastic mass to be formed into a sheet, expressing or otherwise delivering it in a continuous stream or bar of somewhat cylindrical form, ready for preliminary forming into a continuous sheet, and, if desired, powdering it and the rolls, as with sugar, preliminarily to the subsequent operations, (2) mechanism for giving such cylindrical length of material its first sheet like form, (3) a conveyor for carrying the sheet a certain distance and delivering it to a set of forming mechanisms, (4) forming mechanisms for reducing the sheet in thickness as it progresses therethrough, (5) means for removing the surplus sugar or other powder, (6) means for collecting the excess powder, (7) means for sifting such collected powder, (8) means including a conveyor system for returning the sifted powder to that end of the machine which is adjacent the first mentioned receptacle, where it is conveniently available for reuse, (9) mechanisms for reducing the continuous sheet to convenient lengths for other operations and manipulations, (10) means for slitting the smaller sheets both longitudinally and transversely to form small sections of desired proportions, (11) means for collecting such sections and (12) means for separating and wrapping the sticks of chewing gum thus produced.

The sets of mechanisms referred to under numbers 5, 6, 7 and 8 for the subject matters of my co-pending application Serial No. 266,679, those enumerated under numbers 9 and 10 above for the subject matter of my copending application for patent No. 266,680 and those enumerated under number 11 of my copending application for patent No. 266,681.

Referring first more particularly to Figure 1, which shows the receiving and preliminary forming mechanism most clearly, it will be observed that I have provided a stationary receiver 1, somewhat analgous to a pugging mill, into which the hot, moist or soft plastic material is guided by means of the revolving receiving hopper 2, having an abutment $2^a$ projecting toward the center of the hopper. Within the mill is arranged a revolving screw 3 having a portion $3^a$ abutting against the hopper portion $2^a$, and moving therewith relatively to the stationary receiver 1.

The several parts 1, 2, $2^a$, 3 and $3^a$ co-operate in acting as a pugging mill in mixing, tempering, kneading and finally expressing the stream or bar of material. Below the orifice 4 of the mill is placed a guide 5 of general truncated cone form and adjacent the guide 5 is arranged a rotating power feeding device 6, which may be supplied from any convenient source such as the delivery spout 7 of the powder conveyor, to be below more specifically described. Preliminary forming rolls, rotated in the direction indicated by the arrows, are indicated at 8 and 9 and below them is arranged a guide plate 10 for directing the sheet onto the endless conveyor belt 11 which moves in the direction indicated by the arrow.

Referring now more particularly to Figure 1, the sheet as it passes from the conveyor belt 11 is directed through oppositely disposed pairs of finishing rolls adapted to smooth and compress, and, if desired, to reduce in thickness the sheet as it progresses away from the said rolls 8 and 9.

The sheet as it emerges from the pair of finishing rolls is completed and ready to be cut into suitable lengths for use or for further manipulation.

Inasmuch as the construction thus far described is largely that of my copending application, above referred to, no further detailed description thereof is deemed necessary, but since the instant embodiment of my invention presents certain improvements thereupon involving among other features certain additional advantages attained by a modified form of the receptacle for receiving and kneading the hot or moist plastic mass to be formed into a sheet, I shall now proceed to describe the same with further references to Figures 2, 3 and 4 of the drawing.

The hopper 2 is mounted upon the rotatable supporting ring, 20, by means of the flange, 21, which conveniently may be a segment of a circle. It is demountably secured to the ring, 20, by means of the headed members, 22, engaging key-hole slots 23.

To assist retaining the hopper, 2, in position, it is provided with a depending flange, 24.

In actual practice, I have found that the best results are attained by giving the hopper the contour shown in the drawing, and particularly when used in the manner and for the purpose and in connection with the mechanism described.

Viewing Figure 2, it will be observed that the mouth of the hopper 2, is formed by the curved guide wall 25, which is concentric with the vertical axis of the hopper, by the straight guide walls, 26, 27, on one side of said curved wall 25, and by the reentrant curved guide wall 28, which at 2ᵃ forms an abutment for the material.

Immediately below this abutment 2ᵃ and to the rear thereof, the hopper is provided with a covered extension indicated generally at 30, the curved roof of which slopes downwardly to the outer periphery of the screw 3 and is arranged generally at an angle to the plane of movement of the top of the screw 3.

In order to assure that the plastic mass, as it is fed into the mill, is so fed by implacing into the hopper 2, relatively small portions of material which will be most efficiently acted upon by the machine, the mouth of the hopper is made to cover an area that is but a fraction of that of the plane of rotation of the screw 3, whereby the screw driving the greater part of the revolution thereof is free from the pressure of fresh masses of material but acts upon masses just inserted into the hopper, against the abutment 2ᵃ and forced laterally and downwardly under the roof of the extension 30 and along the curved wedge shaped space between such roof and the top of the screw 3 so that as the screw 3 is rotated contra-clockwise the material is gradually drawn into the mill in the direction of movement of the screw 3, which is the same as the direction of movement of the material through the hopper.

Briefly stated, the method of operation of the machine is as follows:

The mill, 1, is filled with hot, moist or soft plastic material and is gradually fed therefrom in a substantially cylindrical form by means of the feed screw 3. The cylinder thus formed passes between the rolls 8 and 9, being prevented from sticking thereto by means of the application to the cylinder and to the rolls of an ample supply of powdered material fed from the powder feed device, 6, which preferably should be rotatably located between the lower end of the mill and said rolls 8 and 9, though auxiliary powder feed devices may be located at any other desired points on the machine. The sheet formed by the rolls 8 and 9 passing on to the belt, 11, is thereby transferred upwardly and to the right or rear to the forming or thinning rolls. The material becomes considerably cooled during this traverse of the length of the machine and is therefore of suitable consistency and in the condition requisite for reduction in thickness or other manipulation by the sets of finishing rolls.

After it passes the last mentioned rolls, it is ready to be delivered or fed to other mechanism for further action.

While I have referred to the bar or stream of material as it issues from the orifice of the mill as a cylinder, it will be appreciated that a circular cross-section is merely a convenience and by no means essential.

From the foregoing description of my improved sheet making machine and process as arranged for the manufacture of chewing gum, it will be apparent that they are equally applicable for the manufacture of the so-called "prepared roofing" sheets embodying bituminous compounds, wherein a film of fine sand is interposed between the stream of plastic material and the forming mechanism in order to prevent adhesion of the moving bar to the pressure rolls. Similarly that in the manufacture of biscuit, a film of flour may be used to prevent the dough from sticking to the rolls, and that the conveyor, 11, may be made of such length as to give the sheet thus formed a sufficient traverse to become dried to such an extent as may be desirable before further operations are carried out. The function of the powdered substance is, generally, to absorb heat or moisture as the case may be and to prevent direct contact of the material of the bar with the forming device, the powder, of course, acting purely superficially with respect to the material of the sheet. It will be equally clear that such time interval as may be required for the cooling or drying of the preliminarily formed sheet may be provided by suitably modifying the length of the conveyor. The sets of finishing rolls may be of such number as is found desirable for the finishing operations, and are preferably vertically adjustable for controlling the thickness of the finished sheet.

Having thus described my invention and illustrated its use, what I claim as new and desire to secure by Letters Patent is—

1. In a machine of the character described, in combination, a hopper and a mill, one of said elements being movable relatively to the other, about an axis, the hopper being provided with a passage from the inlet to the outlet thereof curved about said axis.

2. In a machine of the character described, in combination, a hopper and a mill, one of said elements being movable relatively to the other, about an axis, the hopper being provided with a passage from the inlet to the outlet thereof curved about said axis in two planes.

3. In a machine of the character described, in combination, a hopper and a mill, one of said elements being movable relatively to the other, about an axis, the hopper being provided with a passage from the inlet to the outlet thereof curved about said axis defined by a laterally curved roof.

4. In a machine of the character described, in combination, a hopper and a mill, one of said elements being movable relatively to the other, about an axis, the hopper being provided with a passage from the inlet to the outlet thereof curved about said axis defined by a downwardly curved roof.

5. In a machine of the character described, in combination, a hopper and a mill, one of said elements being movable relatively to the other, about an axis, the hopper being provided with a passage from the inlet to the outlet thereof curved about said axis defined by a laterally and downwardly curved roof.

6. In a machine of the character described, in combination, a hopper and a mill, one of said elements being movable relatively to the other, about an axis, the hopper being provided with a passage from the inlet to the outlet thereof curved about said axis defined by a roof curved in two planes.

7. In a machine of the character described, in combination, a hopper and a mill, one of said elements being movable relatively to the other, about an axis, the hopper being provided with a passage from the inlet to the outlet thereof curved about said axis and an abutment adapted to guide the material into said passage.

8. In a machine of the character described, in combination, a hopper and a mill, one of said elements being movable relatively to the other, about an axis, the hopper being provided with a passage from the inlet to the outlet thereof curved about said axis and a curved abutment adapted to guide the material into said passage.

9. In a machine of the character described, in combination, a hopper and a mill, one of said elements being movable relatively to the other, about an axis, the hopper being provided with a passage from the inlet to the outlet thereof curved about said axis and an abutment adapted to guide the material into said passage, and an inclined surface by which the material is directed against said abutment.

10. In a machine of the character described, in combination, a hopper and a mill, one of said elements being movable relatively to the other, about an axis, the hopper being provided with a passage from the inlet to the outlet thereof curved about said axis, the hopper being disposed substantially on one side of the axis of rotation.

In testimony whereof I have hereunto signed my name.

CHARLES E. DELLENBARGER.